United States Patent
Ashby et al.

[15] 3,647,399
[45] Mar. 7, 1972

[54] DI (ALKALI METAL) BERYLLIUM TETRAHYDRIDES

[72] Inventors: Eugene C. Ashby, Atlanta, Ga.; Paul Kobetz, Baton Rouge, La.

[73] Assignee: Ethyl Corporation, New York, N.Y.

[22] Filed: Sept. 10, 1964

[21] Appl. No.: 395,985

[52] U.S. Cl. ................................................23/360, 149/109
[51] Int. Cl. ..........................................................C01b 6/24
[58] Field of Search...................................................23/360

[56] References Cited

OTHER PUBLICATIONS

Nuclear Science Abstracts, Vol. 7, No. 3352 (1953) page 410 (POSL QC 770 N96)

*Primary Examiner*—Carl D. Quarforth
*Assistant Examiner*—R. L. Tate
*Attorney*—Donald L. Johnson

[57] ABSTRACT

Novel alkali metal beryllium hydrides of the formula $M_2BeH_4$, wherein M is alkali metal, are prepared by reaction of alkali metal aluminum alkyl hydrides with beryllium alkyls wherein the alkyl groups contain not more than about 10 carbon atoms. The new compounds are effective reducing components for high-energy fuels.

13 Claims, No Drawings

DI (ALKALI METAL) BERYLLIUM TETRAHYDRIDES

This invention relates to and has as its principal objects the provision of novel beryllium compounds, specifically the complex hydrides of beryllium and the alkali metals and the provision of novel methods for the preparation of these compounds.

The novel compositions of this invention are compounds represented by the generic formula $$M_2BeH_4$$

wherein M is an alkali metal having an atomic number from 3 to 55, inclusive, i.e., M represents lithium, sodium, potassium, rubidium or cesium. In accordance with this invention it has been found that the above compounds can be prepared by reacting a compound represented by one of the generic formulas, $MAlR_3H$ and $MAlR_2H_2$, or a mixture of such compounds, with a beryllium alkyl of the general formula $BeR_2$. In the foregoing formulas, M represents an alkali metal having an atomic number from 3 to 55, inclusive, and R an alkyl radical containing from one to 10 carbon atoms, inclusive.

The alkali metal beryllium hydrides of this invention are white reactive solids which react readily with carbonyl groups and with protonic substances such as water, acids and air. These compounds are unexpectedly stable to heat, thermal decomposition beginning, in general, only at about 200° C. No solvent has been found for these compounds.

The process of this invention can be and normally is carried out in the absence of any solvent and this procedure constitutes a preferred embodiment of this invention because the reaction proceeds more rapidly in the absence of a solvent than when a solvent is used. However, a solvent can be used if desired. Suitable solvents include dialkyl ethers wherein each alkyl group contains from one to 10 carbon atoms, aliphatic hydrocarbons containing from five to 16 carbon atoms and aromatic hydrocarbons containing from six to 16 carbon atoms, inclusive. Of these solvents, the ethers are preferred because of their high solvent capacity for the reactants. Of the ethers, diethyl ether is particularly preferred because of its ready availability and economy. Other embodiments will appear hereinafter.

The invention will be more fully understood by reference to the following set of illustrative examples in which all parts and percentages are by weight.

EXAMPLE I

Di-tert-butyl beryllium etherate, $t-Bu_2Be·OEt_2$ (58.5 parts), was added slowly, under nitrogen, to 250 parts of $LiAlEt_3H$ (73 percent excess) with stirring. Heat was evolved and the temperature rose to about 90° C. The resulting slurry was filtered and washed successively with 300 parts of benzene and 300 parts of ether. The $Li_2BeH_4$ product was dried under vacuum. The yield was 7.3 parts or 90 percent based on the $t-Bu_2Be·OEt_2$. Analysis gave the following results:

Weight of sample — 27.92 mg.

|  | Found | Theory | Percent Purity |
|---|---|---|---|
| mmoles $H_2$/g. | 145 | 148.9 | 98.4 |
| mg. Be | 9.07 | 9.3 | 97.2 |
| mg. Li | 13.5 | 14.4 | 93.9 |
| percent Al | 0.07 | 0.00 | — |

EXAMPLE II

Di-tert-butyl beryllium etherate (46.8 parts) was added slowly, with stirring, to 200 parts (90 percent excess) of an approximately equimolal mixture of $LiAlEt_3H$ and $LiAlEt_2H_2$. The product was separated, washed and dried as in Example I. The yield of $Li_2BeH_4$ was 86 percent, based on the $t-Bu_2Be·OE t_2$ and the purity, by acid hydrolysis, was 96.5 percent.

EXAMPLE III

Five parts of $LiAlEt_2H_2$ and four parts of di-tert-butyl beryllium monoetherate were mixed. Heat was evolved and the temperature of the mixture rose to about 70° C. The mixture was heated at 60°–80° C. for 2 hours, during which a precipitate formed. One hundred parts of toluene were added; the resulting mixture was stirred and filtered and the residue was washed thoroughly with ether.

Analysis: Beryllium, 29.0 percent; lithium, 54.9 percent; hydrolysis yielded 145 mmoles of hydrogen per gram, corresponding to a purity of 98 percent.

When the $LiAlEt_2H_2$ in Example III is replaced by $MAlR_2H_2$ or by $MAlR_3H$ or by a mixture of the two compounds wherein M represents sodium, potassium, rubidium or cesium and R is an alkyl hydrocarbon group containing from one to 10 carbon atoms, similar results are obtained.

When $LiAl(i-Bu)_3H$, $LiAlEt_2H_2$, or $LiAlMe_3H$ was substituted for the $LiAlEt_3H$ in Example I, similar results were obtained.

EXAMPLE IV 23.6 parts of $NaAlEt_3H$ and 5.0 parts of $Et_2Be$ are mixed and heated to 55° C. for 40 minutes. Twenty-five parts of toluene are added. The mass is stirred for 45 minutes at 60° C., after which 50 parts of diethyl ether are added and the stirring is continued for a brief additional period. The mixture is filtered and the residue washed with ether and dried. The product is $Na_2BeH_4$ of a high degree of purity.

When the $NaAlEt_3H$ in Example IV is replaced by $MAlR_3H$ wherein M represents potassium, rubidium, or cesium and R is an alkyl hydrocarbon group containing from one to 10 carbon atoms, similar results are obtained.

EXAMPLE V

Fifty parts of $KAl(i-Bu)_3H$, 9 parts of dihexyl beryllium and 100 parts of di-n-octyl ether are mixed and heated to 80° C. for 2 hours with vigorous stirring. The mixture is then filtered and the residue is washed thoroughly with dry ether and dried under vacuum. The product is $K_2BeH_4$ of a high degree of purity.

When the di-n-octyl ether in Example V is replaced by di-n-hexyl ether, di-n-decyl ether, benzene, toluene, orthoxylene, n-propyl benzene or cumene, similar results are obtained.

The beryllium reactant in the process of this invention may be represented by the general formula $BeR_2$ wherein R is a saturated alkyl radical containing from one to about 10 carbon atoms, for example, dimethyl beryllium, diethyl beryllium, methylethyl beryllium, diisobutyl beryllium, di-tert-amyl beryllium, di-n-hexyl beryllium and di-n-decyl beryllium.

The aluminum reactant may be a compound or mixture of compounds represented by the general formulas $MAlR_3H$ and $MAlR_2H_2$, wherein M represents an alkali metal, i.e., lithium, sodium, potassium, rubidium, or cesium and R is a saturated alkyl radical containing from one to about 10 carbon atoms. Examples of this reactant include lithium aluminum trimethyl hydride, sodium aluminum tri-n-propyl hydride, lithium aluminum tri-tert-amyl hydride, potassium aluminum tri-n-hexyl hydride, rubidium aluminum tri-isooctyl hydride, cesium aluminum tri-n-decyl hydride, lithium aluminum diisononyl dihydride, sodium aluminum diisoheptyl dihydride, potassium aluminum diisoamyl dihydride, rubidium aluminum diethyl dihydride, cesium aluminum dimethyl dihydride, and mixtures of any two or more of these compounds. Furthermore, the alkyl groups in the beryllium and aluminum reactants may be the same or different.

The aluminum reactants described above are prepared by reaction of the appropriate trialkylaluminum with the appropriate alkali metal hydride, the latter being present in excess of the stoichiometric requirement. The reaction may be carried out in the presence or in the absence of a solvent, depending upon the solubility of the desired product. Thus, for example, sodium aluminum triethyl hydride can be prepared by the reaction of triethylaluminum with excess sodium hydride in toluene. When reaction is complete, the mixture is filtered to remove excess sodium hydride and impurities. The toluene is removed under vacuum and the residue is washed with hexane and dried. The product can be recrystallized from benzene.

Lithium aluminum diethyl dihydride can be prepared in a similar manner from diethyl aluminum hydride and excess lithium hydride.

As indicated above, the reaction of the invention can be carried out in the presence or in the absence of a solvent. Reaction in the absence of a solvent is generally preferred because the reaction usually proceeds more rapidly under such conditions than in the presence of a solvent.

Suitable solvents for the reaction of the invention—when solvents are used—include dialkyl ethers, aliphatic hydrocarbons and aromatic hydrocarbons. Suitable ethers are those wherein each alkyl group contains from one to about 10 carbon atoms; these include diethyl ether, di-n-propyl ether, diisobutyl ether, diisooctyl ether, di-n-octyl ether, di-n-decyl ether and their mixtures. Of these, diethyl ether is preferred because of its availability and economy.

Among the aliphatic hydrocarbons suitable for use as solvents are those containing from five to about 16 carbon atoms and mixtures thereof, for example, n-pentane, n-hexane, isooctane, n-dodecane and cetane, petroleum naphtha, gasoline, and gas oil. Of these, petroleum naphtha is preferred because of its cheapness and availability.

Of the aromatic hydrocarbons those are useful as solvents which contain from six to about 16 carbon atoms, for example, benzene, toluene, the xylenes, cumene, alphamethyl naphthalene and mixtures thereof. Of these, toluene is preferred because of its cheapness and availability and because its liquid range is well suited to the reactions of the invention.

In manufacturing the compounds of this invention the ratio of the reactants can be varied within wide limits, namely, from a 100 percent or greater excess of the beryllium reactant to a 100 percent or greater excess of the aluminum reactant. Proportions approximating stoichiometric give satisfactory results and, because of the insolubility of the alkali metal beryllium hydride product, no significant yield advantage is obtained by using a marked excess of one or the other reactant.

When a reaction solvent is used, the proportions can range from about 10 to about 200 or more parts of solvent per part of reactant by weight.

When the reaction is carried out in the absence of a solvent, a wide variety of temperatures can be employed. Thus, the useful temperature range extends from 25° C. or below to the decomposition temperatures of the reactants and products. When a solvent is employed, the entire liquid range of the solution is available for use; the preferred temperature range is from about 25° C. to about 110° C. because the most useful solvents boil in this range.

The reactions of the invention can be carried out at pressures ranging from 0.1 atmosphere or below to 10 atmospheres or above. Since no yield advantage has been observed for either lower or higher pressures, pressures approximating 1 atmosphere are preferred because of the simplicity of the equipment associated with the use of such pressures.

The reaction period can range from less than 10 minutes to 12 hours or more. Generally speaking, the higher the reaction temperature, the shorter the reaction period. The use of solvents in general lowers the maximum available reaction temperature and thus increases the time required for completion of the reaction.

The reaction of this invention may be carried out under any atmosphere inert to both reactants and products, but dry nitrogen is preferred. Other suitable protective atmospheres include hydrogen, carbon monoxide, gaseous hydrocarbons, helium, argon, krypton, and xenon.

As indicated above, the products of this invention are white, chemically reactive solids which have not been found to be soluble in any known solvents. They are exothermic compounds which are stable at temperatures in excess of 200° C. Lithium beryllium hydride has been found to have a density of about 0.70 gram per cc. and a molal heat of formation of −79.9 kilocalories at 25° C.

The alkali metal beryllium hydride products of this invention are highly effective reducing components for high-energy jet and rocket fuels and are useful intermediates in the preparation of beryllium and other metal hydrides, the alkali metal hydride component of the product being removed by treatment with dimethyl sulfoxide or hydrogen bromide. Furthermore, they are valuable reducing agents in a variety of organic syntheses, and provide a convenient source of small amounts of pure hydrogen.

We claim:

1. As a new composition of matter, the compound represented by the general formula $M_2BeH_4$, wherein M is an alkali metal having an atomic number from 3 to 55, inclusive.

2. Dilithium beryllium tetrahydride.

3. Disodium beryllium tetrahydride.

4. A process for the preparation of a compound represented by the general formula $M_2BeH_4$, wherein M is an alkali metal having an atomic number from 3 to 55, inclusive, which comprises reacting, under an atmosphere inert with respect to reactants and products, a compound selected from the group consisting of compounds represented by the general formulas $MAlR_3H$ and $MAlR_2H_2$ and mixtures of said compounds with a compound represented by the general formula $BeR_2$, wherein M is an alkali metal having an atomic number from 3 to 55, inclusive, and R is an alkyl radical containing from one to about 10 carbon atoms, inclusive, and wherein the radicals represented by R in the aluminum reactant and those so represented in the beryllium reactant can be the same or different.

5. The process of claim 4 wherein M represents lithium.

6. The process of claim 4 wherein M represents lithium and wherein R is selected from the group consisting of methyl, ethyl and tertiary butyl radicals.

7. The process of claim 4 wherein the reaction is carried out in a solvent.

8. The process of claim 4 wherein the reaction is carried out in a solvent consisting of a dialkyl ether wherein each alkyl group contains from one to about 10 carbon atoms, inclusive.

9. The process of claim 4 wherein the reaction is carried out in diethyl ether as a solvent.

10. The process of claim 4 wherein the reaction is carried out in a solvent consisting of an aliphatic hydrocarbon containing from about five to about 16 carbon atoms, inclusive.

11. The process of claim 4 wherein the reaction is carried out in a solvent consisting of an aromatic hydrocarbon containing from six to about 16 carbon atoms, inclusive.

12. The process of claim 4 wherein the reaction is carried out in toluene as a solvent.

13. The process of claim 4 wherein the reaction is carried out in the absence of a solvent.

* * * * *